(12) United States Patent
Asakura

(10) Patent No.: US 9,030,578 B2
(45) Date of Patent: May 12, 2015

(54) IMAGE PICKUP APPARATUS

(71) Applicant: Olympus Corporation, Tokyo (JP)

(72) Inventor: Ayako Asakura, Tokyo (JP)

(73) Assignee: Olympus Corporation, Tokyo (JP)

( * ) Notice: Subject to any disclaimer, the term of this patent is extended or adjusted under 35 U.S.C. 154(b) by 200 days.

(21) Appl. No.: 13/737,699

(22) Filed: Jan. 9, 2013

(65) Prior Publication Data

US 2013/0182150 A1 Jul. 18, 2013

(30) Foreign Application Priority Data

Jan. 12, 2012 (JP) .................. 2012-004358

(51) Int. Cl.
*H04N 5/262* (2006.01)
*H04N 7/14* (2006.01)
*H04N 5/232* (2006.01)

(52) U.S. Cl.
CPC ........... *H04N 5/262* (2013.01); *H04N 5/23296* (2013.01)

(58) Field of Classification Search
CPC .......................... H04N 5/23296; H04N 5/262
USPC ................ 348/14.16, 240.1–240.3, 345
See application file for complete search history.

(56) References Cited

U.S. PATENT DOCUMENTS

| | | | | |
|---|---|---|---|---|
| 6,128,416 A * | 10/2000 | Oura | ............................. | 382/284 |
| 2006/0050338 A1* | 3/2006 | Hattori | ............................. | 359/9 |
| 2009/0295949 A1* | 12/2009 | Ojala | ....................... | 348/240.99 |
| 2011/0064327 A1* | 3/2011 | Dagher et al. | ................ | 382/263 |
| 2011/0069151 A1* | 3/2011 | Orimoto | ........................ | 348/42 |

FOREIGN PATENT DOCUMENTS

| | | |
|---|---|---|
| JP | 2006-074259 | 3/2006 |
| JP | 2007-043325 | 2/2007 |
| JP | 2007-150903 | 6/2007 |
| JP | 4 348 261 | 7/2009 |
| JP | 4 573 724 | 8/2010 |
| JP | 4 624 245 | 11/2010 |

* cited by examiner

Primary Examiner — Trung Diep
(74) Attorney, Agent, or Firm — Kenyon & Kenyon LLP

(57) ABSTRACT

An image pickup apparatus includes a plurality of optical systems, each having a different focal length, an image pickup element which picks up an image of an object by the optical system, and a zoom control section which changes an angle of field of an output image by at least one optical system from among the plurality of optical systems, and a part of the angle of field which changes is same as an angle of field of another optical system, and the image pickup apparatus further includes a control section which changes a control position of a display image at the time of zooming to be directed toward an optical-axial center of the another optical system for which the part of the angle of field is same.

13 Claims, 14 Drawing Sheets

IMAGE PICKUP APPARATUS

CROSS-REFERENCE TO RELATED APPLICATION

The present application is based upon and claims the benefit of priority from the prior Japanese Patent Application No. 2012-004358 filed on Jan. 12, 2012; the entire contents of which are incorporated herein by reference.

BACKGROUND OF THE INVENTION

1. Field of the Invention
The present invention relates to an image pickup apparatus.
2. Description of the Related Art
An optical system which is mounted in a small-size information terminal is sought to be small-size, particularly slim. Moreover, a wide zoom range without interchanging a lens has also been sought.

Therefore, a structure which has a plurality of optical systems, and in which small-sizing is facilitated by preventing a degradation of the number of pixels in a shooting range (namely, capturing range), even in a wide zoom range by carrying out zooming has been proposed. Furthermore, for smooth switching over among the plurality of optical systems, measures such as imparting overlapping of angles of field between different optical systems by zooming have been taken.

For instance, in Japanese Patent No. 4348261, two zoom lenses, each having fixed focal point, are treated as a series of zoom by electronic zooming. Moreover, degradation of image quality is suppressed by trimming.

For instance, in Japanese Patent No. 4573724, a structure in which an optical zooming and an electronic zooming are used in combination, and a switch-over point of an optical system is changed by zooming in and zooming out, and the number of switch-overs of the optical system is reduced, has been proposed.

Furthermore, for instance, in Japanese Patent No. 4624245, for switching over between the optical zooming and the electronic zooming, a focal-length gap between a focal length of a fixed focal-length lens and the minimum focal length of the zoom lens is interpolated by electronic zooming of a digital image which has been achieved by the fixed focal-length lens.

SUMMARY OF THE INVENTION

An image pickup apparatus according to the present invention includes
a plurality of optical systems, each having a different focal length,
an image pickup element which picks up an image of an object by the optical system, and
a zoom control section which changes an angle of field of an image output by at least one optical system from among the plurality of optical systems, and
a part of the angle of field which changes is same as an angle of field of another optical system, and the image pickup apparatus further includes
a control section which changes a central position of a display image at the time of zooming to be directed toward an optical axial center (optical center) of another optical system for which the part of the angle of field is same.

DETAILED DESCRIPTION OF THE INVENTION

An action and an effect by a structure of an image pickup apparatus according to an embodiment of the present invention will be described below. However, the present invention is not restricted to the embodiment described below. In other words, although a large amount of specific contents in detail is included for exemplification in the description of the embodiment, various modifications and variations made in these contents in detail will be within the scope of the present invention. Consequently, the exemplary embodiment of the present invention which will be described below is described without losing a generality or without restricting the invention for which the right has been claimed.

Figure 1:
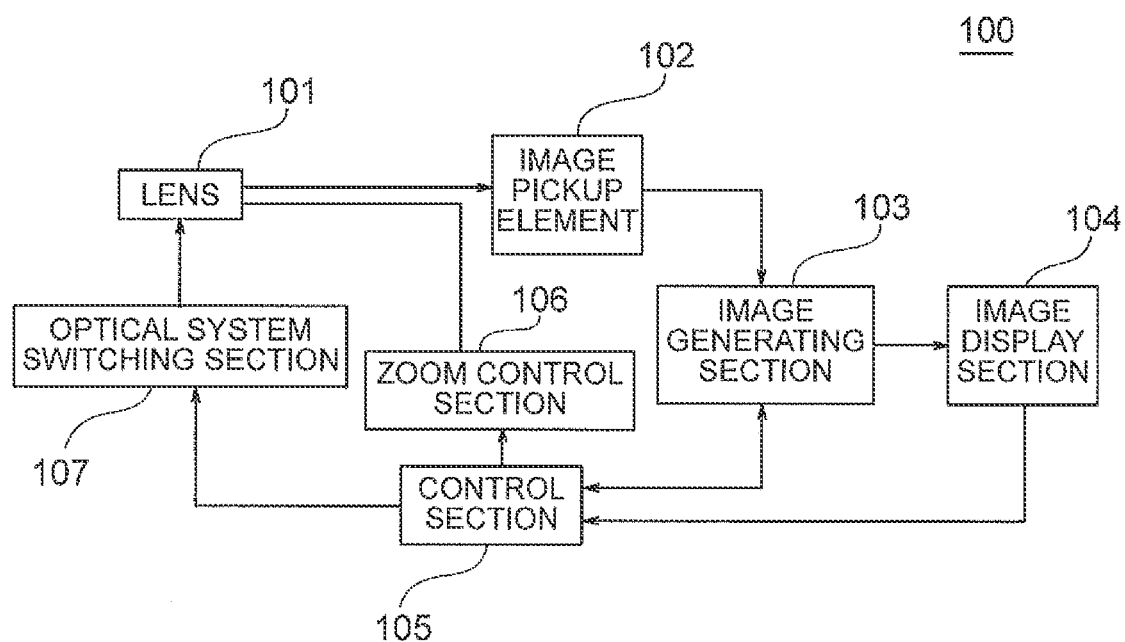
FIG. 1 is a diagram showing functional blocks of an image pickup apparatus according to an embodiment of the present invention.

FIG. 1 is a diagram showing functional blocks of an image pickup apparatus 100 according to the embodiment of the present invention. Details of functions of the image pickup apparatus 100 will be described later.

Figure 2:
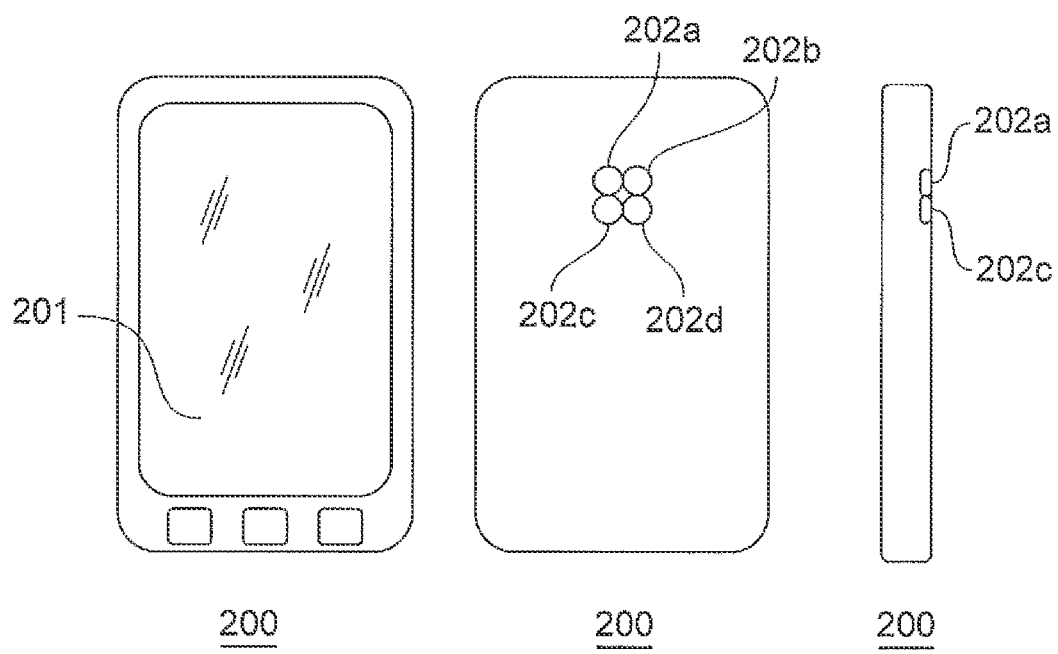
FIG. 2A is a front view when the image pickup apparatus is applied to a mobile telephone.
FIG. 2B is a rear view of the mobile telephone.
FIG. 2C is a side view thereof.

FIG. 2A is a diagram when a mobile telephone 200 which is an example of the image pickup apparatus is viewed from a front side, FIG. 2B is a diagram when the mobile telephone 200 is viewed from a rear side, and FIG. 2C is a side view of the mobile telephone 200.

In FIG. 2A, a display section 201 displays an image which has been picked up by an optical system which will be described later. In FIG. 2B, the mobile telephone 200 has a plurality of optical systems each having a different focal length. The mobile telephone 200 in the embodiment has four optical systems 202a, 202b, 202c, and 202d, each having a different focal length. The mobile telephone 200 may be a mobile information processing apparatus such as a PHS (personal handy phone system), a smart phone, and a PDA (personal digital assistance).

Figure 3:
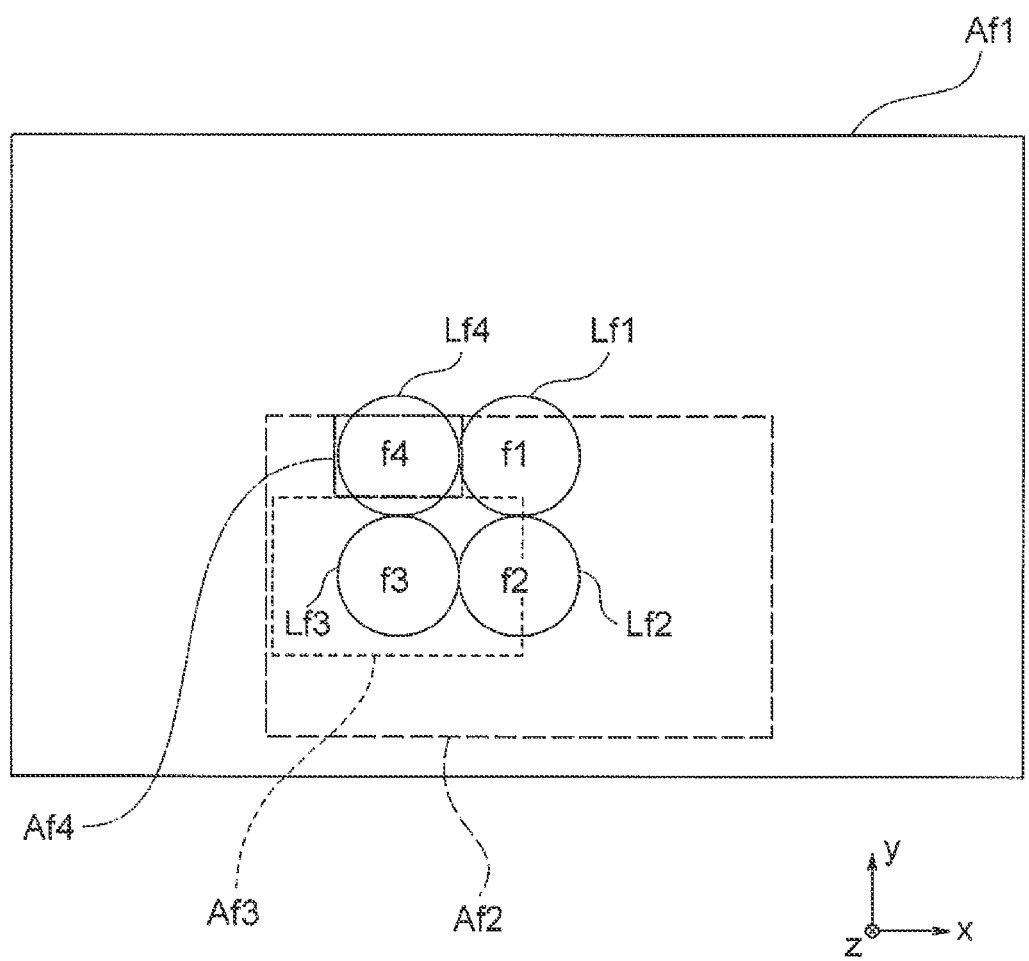
FIG. 3 is a diagram showing an arrangement of a plurality of optical systems in the image pickup apparatus according to the embodiment, and a shooting range thereof.

FIG. 3 is a diagram showing an arrangement of a plurality (n=4) of optical systems Lf1, Lf2, Lf3, and Lf4, and a shooting range thereof. FIG. 3 is let to a diagram when a user has viewed a direction of capturing an object from a side of an image pickup element I (102).

For instance, the four optical systems Lf1, Lf2, Lf3, and Lf4 correspond to the four optical systems 202a, 202b, 202c, and 202d shown in FIG. 2A, FIG. 2B, and FIG. 2C.

The optical system Lf1 has a focal length $f_1$. The optical system Lf2 has a focal length $f_2$. The optical system Lf3 has a focal length $f_3$. The optical system Lf4 has a focal length $f_4$.

Moreover, the focal lengths of the four optical systems have the following relation.

$$f_1 < f_2 < f_3 < f_4$$

Af1 is a shooting range of the optical system Lf1. Af2 is a shooting range of the optical system Lf2. Af3 is a shooting range of optical system Lf3. Af4 is a shooting range of the optical system Lf4.

As it is evident from FIG. 3, as the focal length of the optical systems goes on becoming longer from $f_1$ to $f_4$, the shooting range goes on becoming narrower from Af1 to Af4.

Next, an 'angle of field' in the embodiment will be described below. To start with, FIG. 4A is a diagram explaining a definition of a general angle of field.

Figure 4A:
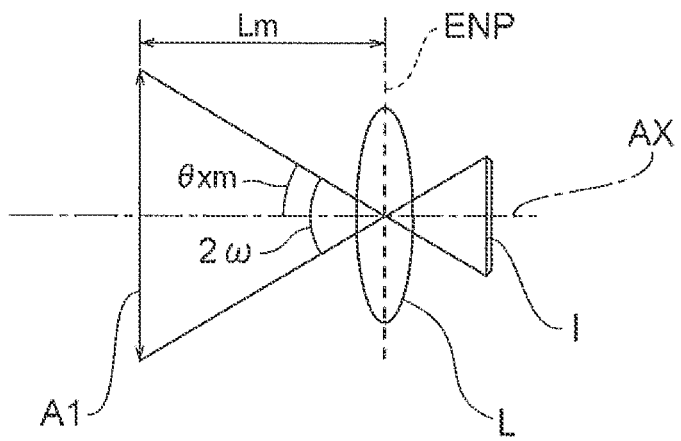
FIG. 4A, FIG. 4B, and FIG. 4C are diagrams describing a relationship of the shooting range and a display image.

In FIG. 4A, an angle 2ω made by a diameter (size of an entrance window) of a display range A1 (diagonal, opposite corner) with respect to a center of an entrance pupil ENP of an optical system L is called as an angle of field. Moreover, in FIG. 4A, the optical system L has an optical axis AX. The image pickup element I picks up an object image.

Figure 4B:
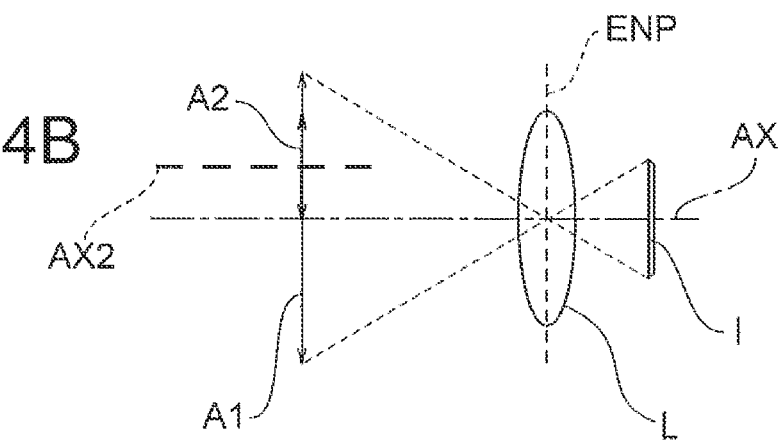
Figure 4C:
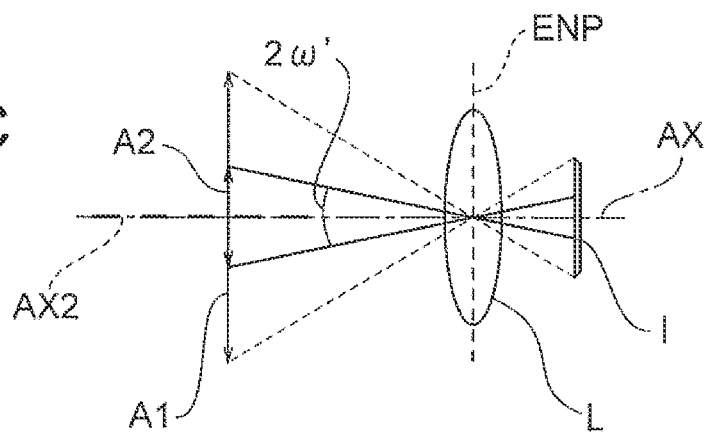

Next, as shown in FIG. 4B, a display range A2 (diagonal) has a central axis AX2 at a position changed from the optical axis AX. Moreover, as shown in FIG. 4C, the central axis AX2 in the display range A2 is changed downward in the diagram and the central axis AX2 and a center of the entrance pupil ENP (a point of intersection with the optical axis AX) are made to coincide virtually. At this time, an angle 2ω' which the diameter (size of the entrance window) of the display range A1 (diagonal) makes with respect to the center of the entrance pupil ENP of the optical system L is also called as the 'angle of field' in the embodiment.

The 'shooting range' means a range in which the image pickup apparatus has captured an image. The 'display range', in a case of electronic zooming, means a range of displaying upon cutting out from the shooting range, and in a case of optical zooming, means a range same as the shooting range.

Furthermore, a 'shift' means a movement of range. The 'change' means a change of an axis or a position.

Figure 5:
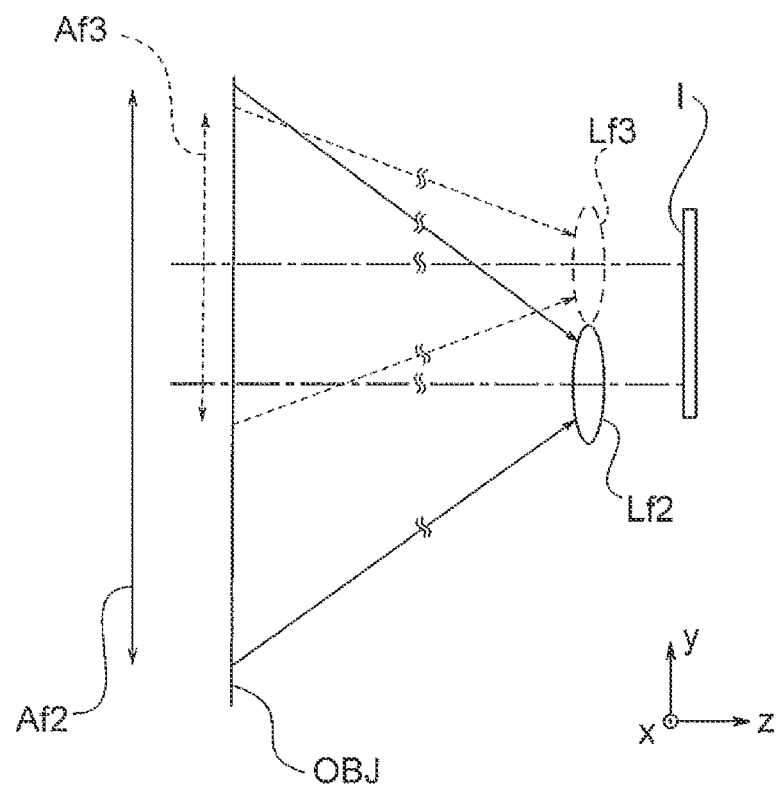
FIG. 5 is a cross-sectional structural diagram of the optical system of the image pickup apparatus.

FIG. 5 is a cross-sectional structural view when the optical systems Lf2 and Lf3 from among the four optical systems are seen in y-direction from a lower side in FIG. 3. Here, as it has been mentioned above, an arrangement is such that the focal length $f_3$ of the optical system Lf3 is longer than the focal length $f_2$ of the optical system Lf2.

Therefore, the shooting range AF3 by the optical system L3 is narrower than the shooting range Af2 by the optical system Lf2 for an object OBJ.

Images of the object OBJ by the optical systems Lf2 and Lf3 respectively are formed on an image pickup surface of the image pickup element I.

A basic structure and operation of the image pickup apparatus 100 will be described below by referring to FIG. 1.

A zoom control section 106 changes an angle of field of an output image which is output by at least one of the plurality of optical systems Lf1, Lf2, Lf3, and Lf4. The change in the angle of field is carried out by optical zooming, or by electronic zooming, or by a combination of the optical zooming and the electronic zooming.

Here, a part of the angle of field which changes, of any one of the plurality of optical systems Lf1, Lf2, Lf3, and Lf4 is same as an angle of field of the other optical system. When it is said that the part of the angle of field is same, it also includes a case in which the part of the angle of field is substantially same.

A control section 105 changes a central position of the display range which has changed at the time of zooming toward an optical axial center (optical center) of the other optical system having the part of the angle of field same. At this time, it is desirable to change a speed of changing the central position of the display range according to an amount of change of zooming.

For instance, as it has been mentioned above, the image pickup apparatus 100 has n number of optical systems (n=4 in the embodiment). Moreover, the focal length $f_1$ is a focal length of the optical system which has the maximum focal length at the wide angle end. The focal length $f_4$ is a focal length of the optical system which has the maximum focal length at the telephoto end.

At the time of zooming, the central position of the display range goes on changing. Therefore, as in the conventional technology, when merely the optical system is changed, a problem of sudden shifting of the shooting range which the user has been observing arises. As a concrete example of the problem of sudden shifting, at the time of zooming-in upon targeting certain object, when the optical system is switched over, a situation in which that object goes out of the shooting range arises.

In the embodiment, the control section 105 changes the central position of the display range which has been changed at the time of zooming, toward an optical axial center of the other optical system having the part of the angle of field same.

Concretely, a focal length $f_m$ indicates mth focal length in order of short focal lengths (having an mth shorter focal length). At the time of zooming in, when an amount of zooming of each optical system has become maximum in order of focal lengths $f_1, f_2, \ldots, f_n$, or when the angle of field has become same as the angle of field of the other optical system, the optical system is switched over.

Whereas, at the time of zooming out, the optical system is switched over in order of $f_n, f_{n-1}, \ldots, f_1$.

A center of the display range changes at the time of zooming operation. Here, the zooming in and zooming out includes both the electronic zooming and the optical zooming. According to a selection by the user, the zoom control section 106 carries out these zooming controls.

The electronic zooming is a zooming in which, an image is magnified by processing electrically image data of an image which has been picked up by the image pickup element I.

Figure 6:
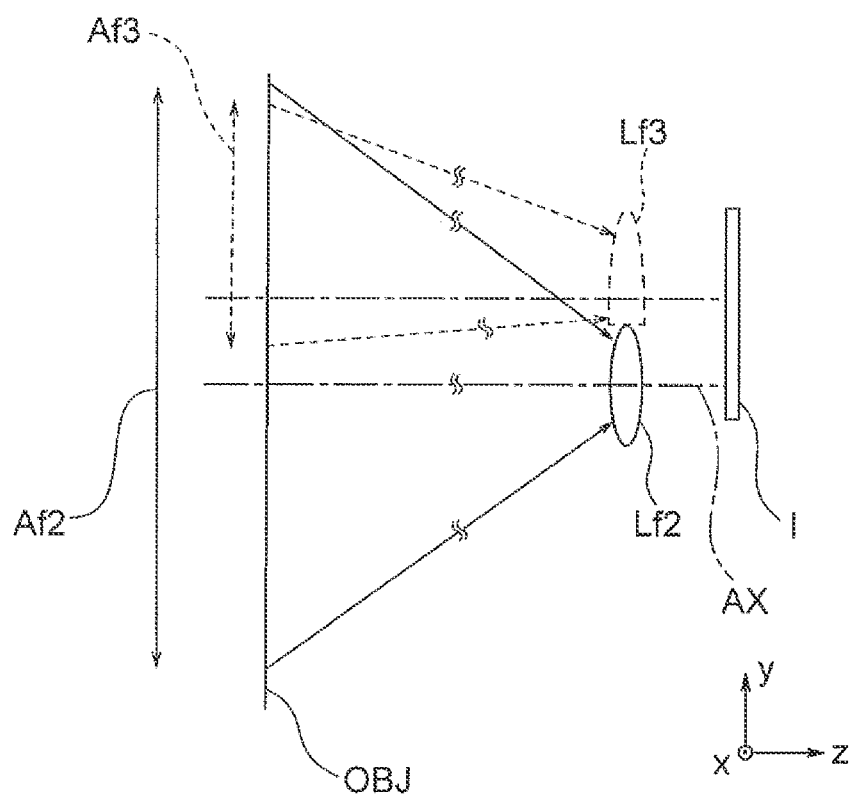
FIG. 6 is a cross-sectional structural diagram of the optical system of the image pickup apparatus which carries out optical zooming.

For the optical zooming, as shown in FIG. 6 for instance, an optical system in which an image is formed on the image pickup element I by using the plurality of lenses Lf2 and LF3, each having different focal length, can be used.

In the embodiment, an effect in which is it possible to suppress an amount of shift of the shooting range when the optical system has been switched over by changing the central position of the display image while having a plurality of optical systems, is shown.

The description will be continued further by referring to FIG. 3. To start with, problems which have hitherto been involved will be mentioned. At the time of zooming in from the optical system Lf2 and switching over to the optical system Lf3, in a case of changing a center of the display range Af2, as one goes on zooming in by using the optical system Lf2, the angle of field becomes same as the focal length $f_3$ of the optical system Lf3, and the display range of the optical system Lf2 assumes same size as the size of the display range Af3 of the optical system Lf3 (the angle of field is same but the shooting range is different).

Here, since an angle of field of the optical system Lf2 and an angle of field of the optical system Lf3 become same, as in the conventional technology, when the optical system is switched over from the optical system Lf2 to the optical system Lf3, the shooting range changes. At this time, a part of the object which exists in the shooting range of the optical system Lf2 goes out of frame of the shooting range by the optical system Lf3, and there is a possibility that the user loses sight of the object.

Next, the embodiment will be described below. In the embodiment, the center of the display range is to be changed according to the zooming operation.

As an object is zoomed in by using the optical system Lf2, the display range Af2, while becoming smaller gradually, shifts toward an optical axial center of the optical system Lf3. Moreover, when the angle of field of the optical system Lf2 becomes same as the angle of field of the optical system Lf3, the display range Af2 is in a state of overlapping the display range Af3 of the optical system Lf3.

In such manner, in the embodiment, in the process of zooming in, it is possible to identify the shift of the shooting range easily. For instance, in a case in which the user has targeted a specific object, without losing a sight of a position of that specific target, a correction of the capturing operation is unnecessary.

The optical system Lf2 is zoomed in further, and a center of the display range when the angle of field is same as (the angle of field of) the optical system Lf3, becomes same as a center of the display range Af3 of the optical system Lf3. As a result, in the embodiment, an effect that even when the optical system Lf2 is switched over to the optical system Lf3, the display range does not change, is shown.

(Capturing Procedure)

Figure 7:
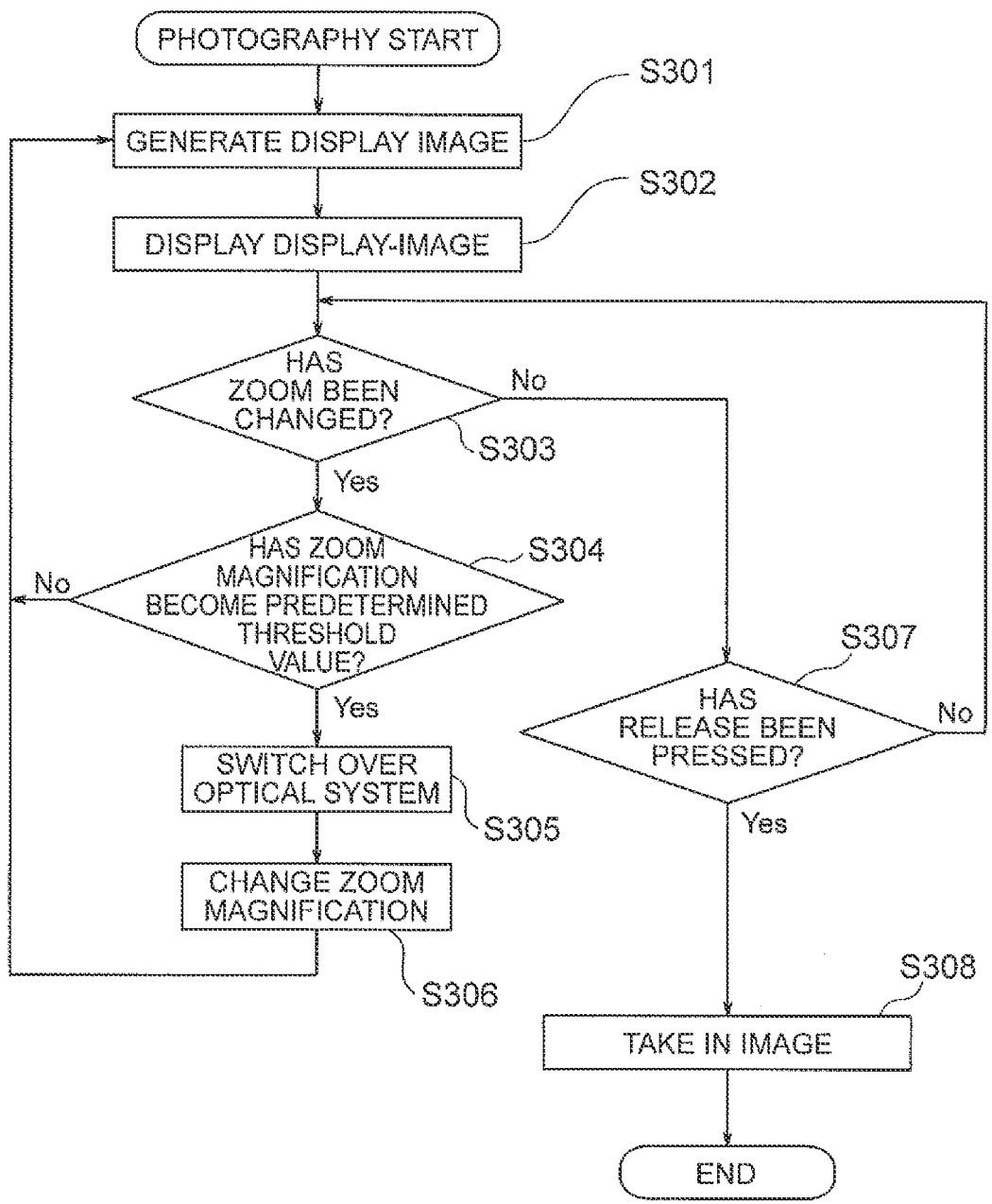
FIG. 7 is a flowchart showing a capturing procedure.
Figure 8A:
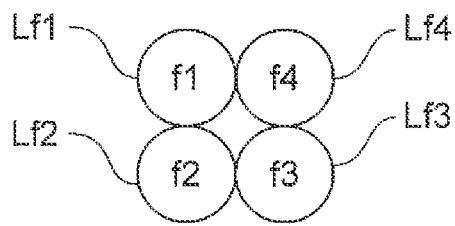
FIG. 8A, FIG. 8B, FIG. 8C, FIG. 8D, FIG. 8E, FIG. 8F, and FIG. 8G (hereinafter, 'FIG. 8A to FIG. 8G') are diagrams when examples of layouts of the plurality of optical systems, each having a different focal length, are viewed from a front side.
Figure 8B:
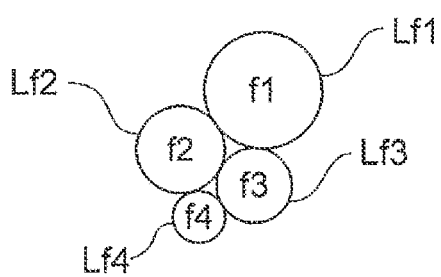
Figure 8C:
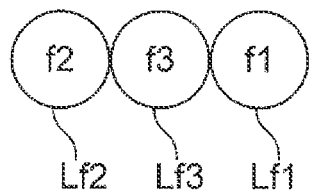
Figure 8D:
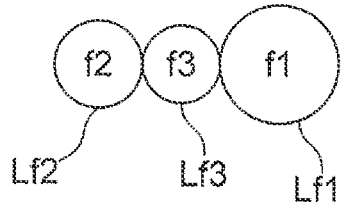
Figure 8E:
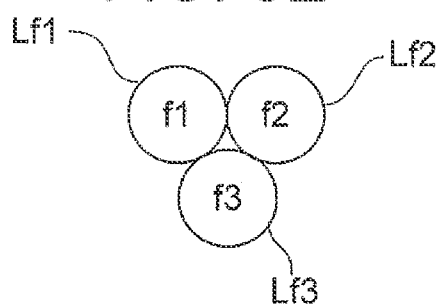
Figure 8F:
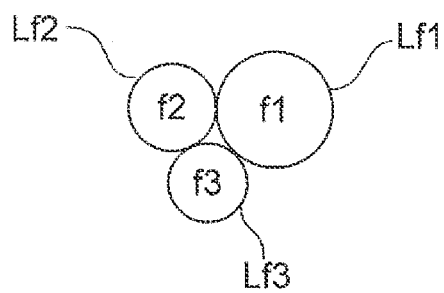
Figure 8G:
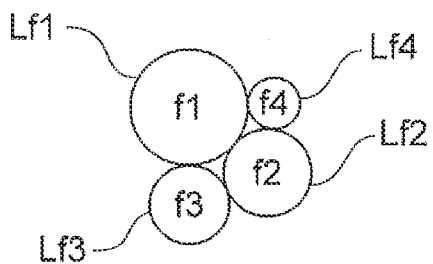

The abovementioned procedure will be described below by using a flowchart in FIG. 7.

To start with, the user starts capturing. At step S301, an image generating section 103 generates a display image based on an image signal.

Generation of the display image includes a movement of a center of the display image, and an image synthesis.

At step S302, an image display section 104 displays the display image. At step S303, the control section 105 makes a judgment of whether or not the user has carried out a zooming change. When a result at step S303 is negative (No at step S303), a judgment of whether or not a 'release' has been pressed is made at step S307.

When a judgment result at step S307 is affirmative (Yes at step S307), an image is taken in at step S308, and the process is terminated. At this time, it is also possible to take in the display range as image data.

When a judgment result at step S307 is negative (No at step S307), step S303 is repeated.

At step S303, when a judgment is made that the zooming change has been there, the process advances to step S304. At step S304, a judgment of whether or not a zoom magnification has assumed a predetermined threshold value, or in other words, whether it is a magnification zooming or a reduction zooming, is made.

When a judgment result at step S304 is negative (No at step S304), the process returns to step S301.

When the judgment result at step S304 is affirmative (Yes at step S304), in a case of a zooming in a magnification direction, when the zoom magnification becomes maximum which is equal to the threshold value, an optical system switching section 107, at step S305, changes the optical system to an optical system having a next longer focal length, and changes the zoom magnification to 1.

Whereas, in a case of a zooming in a reduction direction, when the zoom magnification becomes one time, which is equal to the threshold value, the optical system switching section 107, at step S305, changes the optical system to an optical system having a next shorter focal length, and changes the zoom magnification to the maximum zoom magnification.

The switching of the optical system may be manual or automatic.

At step S306, the zoom control section 106, conforming to the abovementioned judgment result, changes the zoom magnification, and the process returns to step S301.

Moreover, the plurality of optical systems includes n number of optical systems.

A focal length of an optical system having an mth focal length in order of short focal lengths (having mth shorter focal length) is let to be $f_m$ (m=1~n, and m and n are integers).

Furthermore, when a focal length $f_1$ is let to be a focal length at a wide angle end, and a focal length $f_n$ is let to be a focal length at a telephoto end, the optical system having the focal length $f_m$ may be an optical system having a fixed focal point.

It is desirable that the zoom control section 106 carries out zooming by electronic zooming.

By carrying out electronic zooming, movement of a lens by the optical system becomes unnecessary. Therefore, it is possible to facilitate small sizing of the image pickup apparatus. Furthermore, it is also possible to simplify mechanisms such as a mechanical drive mechanism. Furthermore, since there is no drive sound, the zooming is possible silently, and since electrical processing is carried out, the movement is smooth. These are the effects which are shown by electronic zooming.

Here, a variation in an arrangement of the plurality of optical systems will be described below. FIG. 8A, FIG. 8B, FIG. 8C, FIG. 8D, FIG. 8E, FIG. 8F, and FIG. 8G are diagrams when arrangements of the three optical system Lf1, Lf2, and Lf3, or four optical systems Lf1, Lf2, Lf3, and Lf4 are viewed from a front side.

In the diagrams, for making it easy to understand, with the focal length becoming shorter (the optical system becoming a wide angle optical system), a diameter of a circular lens is shown to be larger.

Figure 9A:
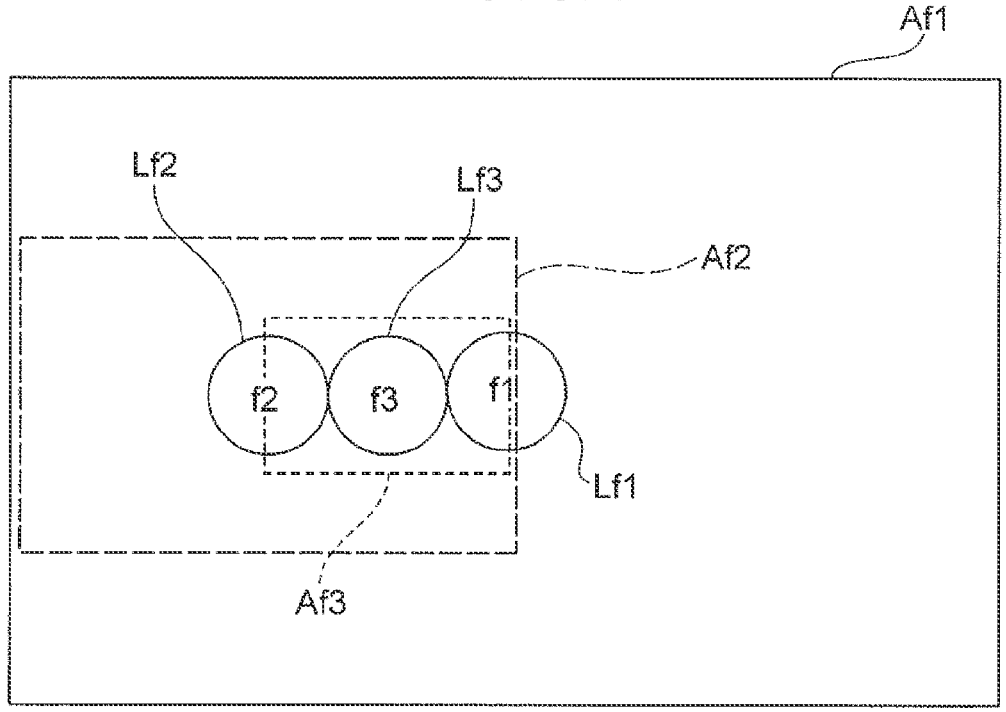
FIG. 9A and FIG. 9B are diagrams showing examples of shooting range.

FIG. 9A shows the shooting ranges Af1, Af2, and Af3 of the three optical systems Lf1, Lf2, and Lf3 respectively.

Figure 9B:
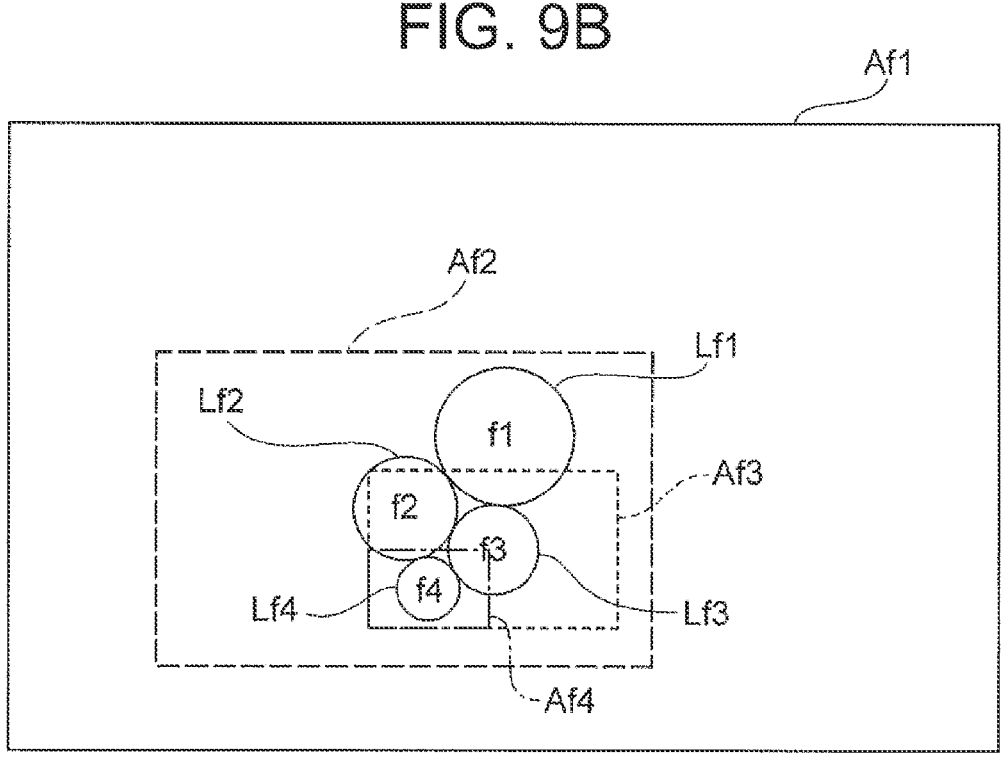

FIG. 9B shows the shooting ranges Af1, Af2, Af3, and Af4 of the four optical systems Lf1, Lf2, Lf3, and Lf4.

Moreover, in the embodiment, it is desirable to make the following arrangement.

Figure 10:
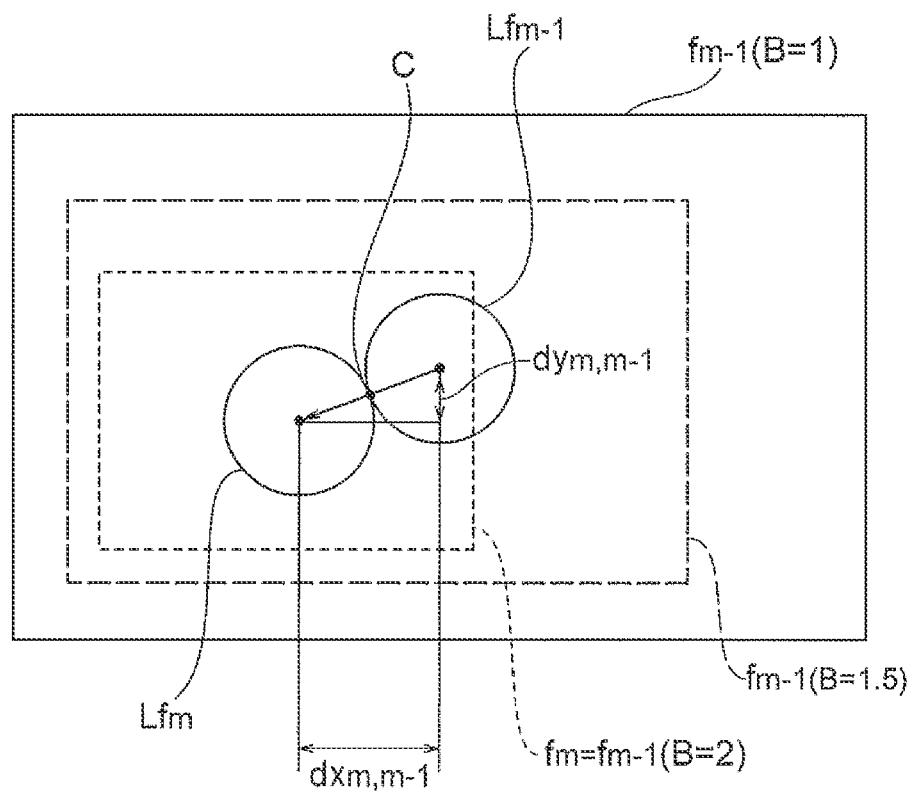
FIG. 10 is a diagram a showing zooming and a shooting range.

The description will be made by referring to FIG. 10.

It is desirable that at the time of zooming between the optical system having the focal length $f_m$ and an optical system having a focal length $f_{m-1}$, an amount of change in a horizontal direction of the center of the display range from an optical axial center of the optical system having the focal length $f_m$ and an amount of change in a vertical direction of the center of the display range from an optical axial center of the optical system having the focal length $f_m$ satisfy the following conditional expressions (1) and (2) respectively.

$$x_{m,m-1} = dx_{m,m-1} \times B_{m,m-1}/(B_{m,m-1} - B_{m-1}) \quad (1)$$

$$y_{m,m-1} = dy_{m,m-1} \times B_{m,m-1}/(B_{m,m-1} - B_{m-1}) \quad (2)$$

where, $dx_{m,m-1}$ denotes a distance in the horizontal direction between the optical axial center of the optical system having the focal length $f_m$ and an optical axial center of the optical system having the focal length $f_{m-1}$, $dy_{m,m-1}$ denotes a distance in the vertical direction between the optical axial center of the optical system having the focal length $f_m$ and the optical axial center of the optical system having the focal length $f_{m-1}$, $B_{m-1}$ denotes a zoom magnification at the time of capturing by the optical system having the focal length $f_{m-1}$ and $$B_{m,m-1} = f_m/f_{m-1}.$$

Moreover, 'at the time of zooming between the optical system having the focal length $f_m$ and the optical system having the focal length $f_{m-1}$' means at the time of zooming out the optical system having the focal length $f_m$ or at the time of zooming in the optical system having the focal length $f_{m-1}$, and changing the central position of the display image toward the optical axial center of the optical system having the focal length $f_{m-1}$ or the optical axial center of the optical system having the focal length $f_m$.

Conditional expressions (1) and (2) regulate the amount of change in the horizontal direction of the center of the display range, and the amount of change in the vertical direction of the center of the display range. It is preferable that the maximum zoom magnification is in a range of 1.5 to 2. Accordingly, it is possible to achieve a natural image change.

Furthermore, it is preferable to change a speed of changing the central position of the display range according to an amount of change of zooming. Accordingly, it is possible to achieve a smooth and natural change of magnification.

A case of switching over to the optical system $Lf_m$ having the focal length $f_m$ when the optical system $Lf_{m-1}$ having the focal length $f_{m-1}$ is zoomed in, and the angle of field has become same as the angle of field of the optical system $Lf_m$ having the focal length $f_m$, will be taken into consideration.

When the zoom magnification B by the optical system $Lf_{m-1}$ having the focal length $f_{m-1}$ is equal to 1 (zoom magnification B=1), it is possible to capture an object with a shooting range shown by the largest solid lines. Upon zooming in from this state, when the zoom magnification B by the optical system $Lf_{m-1}$ having the focal length $f_{m-1}$ is 1.5 (zoom magnification B=1.5), the display range becomes smaller to a size shown by dashed lines.

Furthermore, zooming in is carried out by the optical system $Lf_{m-1}$ having the focal length $f_{m-1}$, and the zoom magnification B becomes 2 (zoom magnification B=2). At this time, when the optical system $Lf_{m-1}$ having the focal length $f_{m-1}$ is zoomed in and the angle of field becomes same as the angle of field of the optical system $Lf_m$ having the focal length $f_m$, the optical system is switched over to the optical system $Lf_m$ having the focal length $f_m$.

The optical system $Lf_m$ having the focal length $f_m$ has a shooting range indicated by dotted lines. A center of the display image at the time of zooming of the focal length $f_{m-1}$, changes in a direction of an arrow.

Description will be continued further from a point of view of a situation in which, the change in the angle of field is converted to the focal length virtually.

Let the maximum zoom magnification $B_{m-1}$ max of the optical system $Lf_{m-1}$ be 2.5 (maximum zoom magnification $B_{m-1}$ max=2.5). At it has been mentioned above, when the zoom magnification $B_{m-1}$ of the optical system $Lf_{m-1}$ is 2 (zoom magnification $B_{m-1}$=2), the focal length $f_{m-1}$ and the focal length $f_m$ coincide. Moreover, when $2 < B_{m-1}$ as shown in Table 1 below, there is an overlapping of the angle of field of both the optical systems.

TABLE 1

| Zoom magnification $B_{m-1}$ of $f_{m-1}$ | 1 time | 2 times | 2.5 times |
|---|---|---|---|
| $f_{m-1}$ = 25 mm | 25 mm | 50 mm | 62.5 mm |
| $f_m$ = 50 mm | | 50 mm | |

Even when the zoom magnification has changed, a distance between an optical axis of the optical system $Lf_m$ and an optical axis of the optical system $Lf_{m-1}$ does not change. Therefore, as it has been mentioned above, it is desirable to regulate the amount of change in the horizontal direction of the center of the display range and the amount of change in the vertical direction of the center of the display range by using $f_m/f_{m-1}$ and not the maximum zoom magnification.

By satisfying conditional expressions (1) ad (2), it is possible to change the central position of the display range according to the amount of change of zooming. Accordingly, it is possible to prevent the shooting range after the switching over of the optical system, from being shifted suddenly. Moreover, in the embodiment, it is preferable that the following conditional expressions (3) and (4) are satisfied geometrically.

$$dx_{m,m-1} < L_m \times (\tan \theta x_{m-1} - A \times \tan \theta_{xm}) \quad (3)$$

$$dy_{m,m-1} < L_m \times (\tan \theta y_{m-1} - A \times \tan \theta y_m) \quad (4)$$

$$B_{m,m-1} = f_m/f_{m-1}$$

$$10 \geq A \geq 1$$

where, $dx_{m,m-1}$ denotes a distance in a horizontal direction between an optical axial center of an optical system having a focal length $f_m$ and an optical axial center of an optical system having a focal length $f_{m-1}$, $dy_{m,m-1}$ denotes a distance in a vertical direction between the optical axial center of the optical system having a focal length $f_m$ and the optical axial center of the optical system having the focal length $f_{m-1}$, $B_{m-1}$ denotes a zoom magnification at the time of capturing by the optical system having the focal length $f_{m-1}$, $\theta x_m$ and $\theta x_{m-1}$ denote half angle of field in x-direction, $\theta y_m$ and $\theta y_{m-1}$ denote half angle of field in y-direction, and A is a coefficient.

It is preferable that the coefficient $A \geq 2$.

Conditional expressions (3) and (4) regulate a relationship between the distance between the optical axes of the optical systems, and a close distance from which the capturing is possible, and a focal length and a size of the image pickup element. The conditional expressions (3) and (4) indicate conditions which regulate (suppress) an amount of shift of the shooting range.

Conditional expressions (3) and (4) regulate as to what extent the shooting range of the optical system $Lf_m$ having the focal length $f_m$ is to be included in the shooting range of the optical system $Lf_{m-1}$ having the focal length $f_{m-1}$. For instance, when $1 \leq A$, up to the center of the shooting range of the optical system $Lf_m$ can be included in the shooting range of the optical system $Lf_{m-1}$. Moreover, when $2 \leq A$, whole of the shooting range of the optical system $Lf_m$ can be included in the shooting range of the optical system $Lf_{m-1}$.

Moreover, in the embodiment, when $2 > A > 1$, the shooting range of the optical system having the focal length $f_m$ when the zoom magnification m>1 is included in the shooting range of at least another optical system.

It is preferable that the image generating section 103 interpolates an image outside the shooting range of an optical system which has been selected, in a display range when the center of the display range has changed by using an image inside a shooting range of another optical system which has not been selected.

Figure 12:
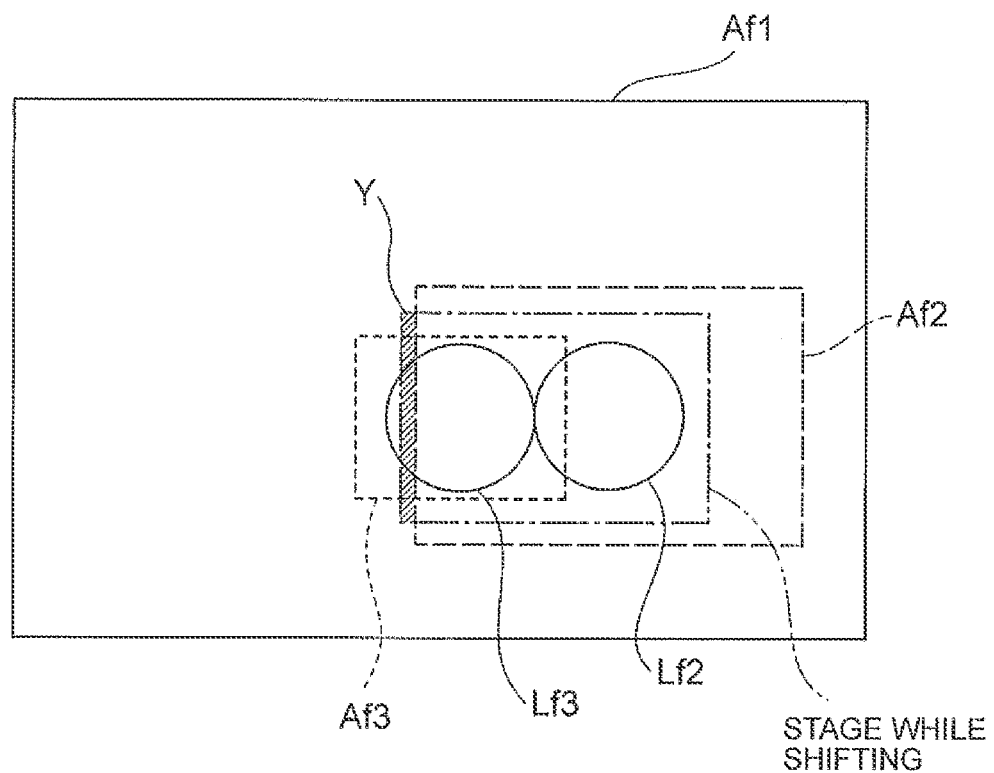
FIG. 12 is a diagram describing an example of interpolating the shooting range.

As shown in FIG. 12, at the time of changing a center of an image in a central direction of a shooting range (shown by dashed lines) by an optical system Lf3 having a focal length $f_3$ while carrying out zooming by an optical system Lf2 having a focal length $f_2$, a portion indicated by hatched lines Y of the shooting range (shown by dashed lines) of the optical system Lf3 with respect to a display range (shown by alternate long and short dashes lines) in a stage while shifting is out of the shooting range.

At this time, an image of hatched lines Y is to be generated by using image information Y of an area same as the hatched lines Y in a shooting range Af1 by the optical system Lf1. Since the interpolation is an interpolation in a surrounding portion, the interpolation is possible while suppressing an effect of degradation of an image quality for the overall image.

Moreover, it is preferable that the image generating section 103 generates a display image by using a captured image of the optical system $Lf_m$ having the focal length $f_m$ and a captured image of the optical system $Lf_{m-1}$ having the focal length $f_{m-1}$.

Accordingly, it is possible to improve resolution and to generate more natural image.

Moreover, it is preferable that the image display section 104 displays a direction of movement of a center of the display image.

Figure 11:
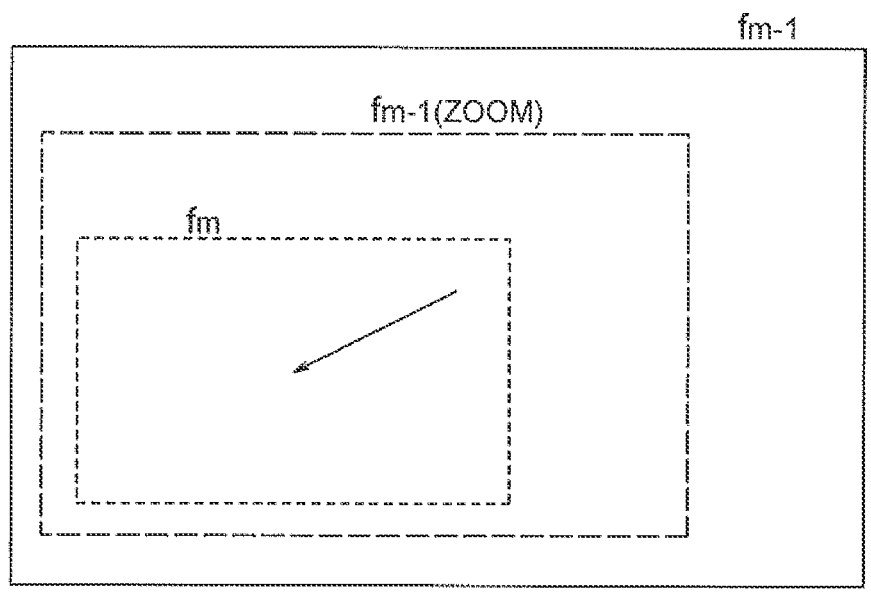
FIG. 11 is a diagram showing a change in the shooting range.

As shown in FIG. 11, the display range changes according to a zooming operation. At this time, by displaying the direction of movement of the center of the display range, it is possible to prevent the user from losing sight of an object. Accordingly, the photography becomes easier.

Moreover, it is preferable that the control section 105 carries out switch over to an optical system having an F-number for which a change in blurring of an image picked up is small, at the time of switching among the plurality of optical systems, and that the following conditional expressions (5) and (6) are satisfied.

$$FNO_{m-1} = FNO_m / ((f_m/f_{m-1})^2) \quad (5)$$

$$f_m > f_{m-1} \quad (6)$$

where, $FNO_{m-1}$ denotes an F-number of the optical system having the focal length $f_{m-1}$ and $FNO_m$ denotes an F-number of the optical system having the focal length $f_m$.

Figure 13:
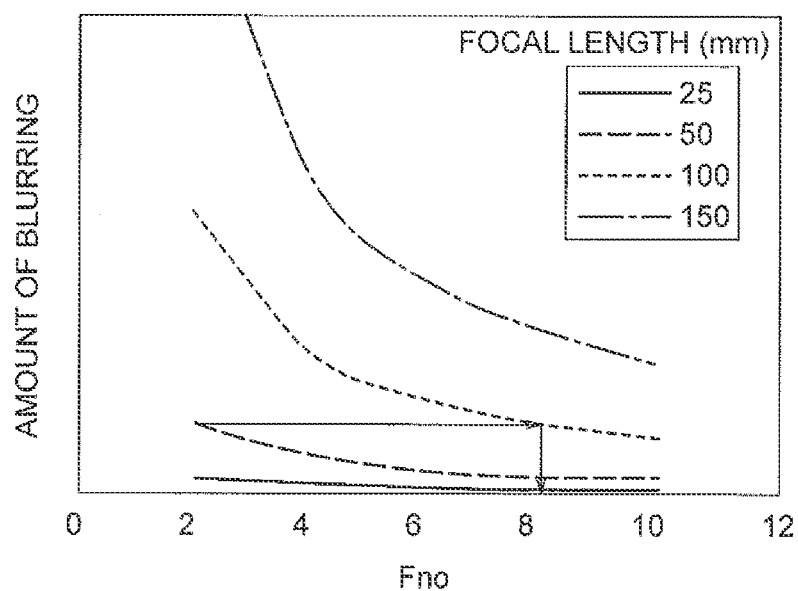
FIG. 13 is a diagram showing a relationship of an amount of blurring and the focal length of the optical system.

By switching over the optical system, a depth of field changes according to the focal length as shown in FIG. 13. By satisfying conditional expressions (5) and (6), it is possible to reduce a change in the amount of blurring at the time of switching over of the optical system. A judgment regarding the amount of blurring is to be made based on spreading of an image of a point light source on the image pickup element when the point light source has been captured.

Moreover, it is preferable that the control section 105 changes a size of an image pickup surface (makes a wide angle end large and a telephoto end small) for each optical system according to the focal length.

Figure 14A:
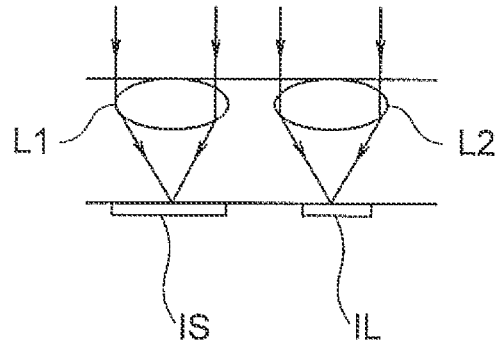
FIG. 14A, FIG. 14B, and FIG. 14C are diagrams showing a variation in a relationship of the optical system and the image pickup element.
Figure 14B:
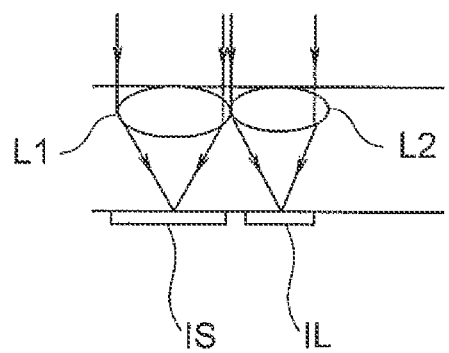

Accordingly, an effective photography is possible. Moreover, as shown in FIG. 14A and FIG. 14B, small-sizing is possible by bringing the optical axes of the optical systems closer.

For instance, it is preferable that the control section 105 makes the size of the image pickup surface small when the focal length of each optical system is toward a telephoto end as compared to when at a wide angle end. The image pickup element may be one for each optical system, or may be one for all the optical systems.

Moreover, in the embodiment, it is preferable that at least one optical system has one or more than one variable refractive power lens (for focusing adjustment).

By using the variable refractive power lens, since there is no lens drive by optical zooming, it is possible to carry out small-sizing and focusing effectively.

Moreover, it is preferable to make an arrangement such that at least in an optical system having the longest focal length from among the plurality of optical systems, light from the object is reflected once or more than once inside a lens in the optical system, and that a distance from a lens surface on an object side of at least the optical system having the longest focal length up to the image pickup element and a distance from a lens surface on the object side of another optical system up to the image pickup element is substantially same.

Figure 14C:
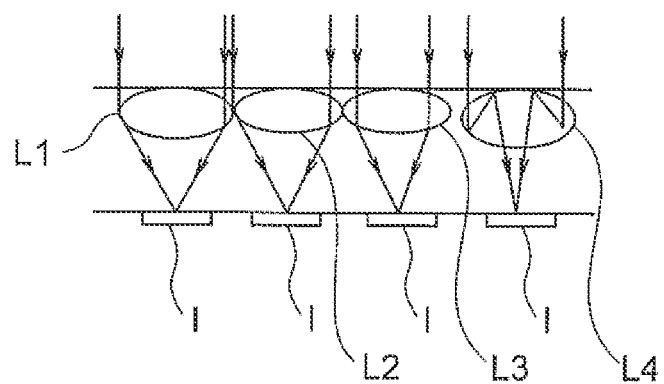

Light from the object is reflected more than once inside a lens L4 from among four lenses L1, L2, L3, and L4 in FIG. 14C, and a distance from the lens 4 up to an image pickup element I is same as a distance from the other lenses L1, L2, and L3 up to the image pickup element I.

Accordingly, it is possible to achieve further small-sizing of the image pickup apparatus as shown in FIG. 14C.

Moreover, it is desirable that the image generating section 103 generates an image in which, parallax from an image of the optical system $Lf_m$ having the focal length $f_m$ and an image of the optical system $Lf_{m-1}$ having the focal length $f_{m-1}$, has been changed. Moreover, it is desirable that the image display section 104 displays the image generated by the image generating section 103.

Accordingly, it is possible to generate an image in which, a viewing-point position has also been shifted.

It is possible to generate an image having an intermediate parallax from two parallax images namely the image of the optical system $Lf_m$ having the focal length $f_m$ and the image of the optical system $Lf_{m-1}$ having the focal length $f_{m-1}$. For instance, when the parallax between the image of the optical system $Lf_m$ having the focal length $f_m$ and the image of the optical system $Lf_{m-1}$ having the focal length $f_{m-1}$ is 1, it is possible to generate an image having parallax 0.5. In other words, when the image of the optical system $Lf_m$ is observed by a right eye and the image of the optical system $Lf_{m-1}$ is observed by a left eye, with both eyes, the image is observed with half proportion which is 0.5.

As a result, it is possible to reduce shift in parallax when the optical system is switched over.

Moreover, it is preferable that the image generating section 103, at the time of zooming with the optical system $Lf_m$ having the focal length $f_m$ and the optical system $Lf_{m-1}$ having the focal length $f_{m-1}$, generates an image corresponding to an amount of at least one of an amount of change $x_{m,m-1}$ in the horizontal direction of the center of the display image from the optical axis (optical axial center) of the optical system $Lf_m$ having the focal length $f_m$ and an amount of change $y_{m,m-1}$ in the vertical direction of the center of the display image form the optical axis of the optical system $Lf_m$ having the focal length $f_m$.

As a result, the parallax of the image generated changes according to the amount of change of the center of the display image. Therefore, by generating the image having a parallax corresponding to at least one of the amount of change in the horizontal direction and the amount of change in the vertical direction, it is possible to reduce a shift in parallax when the optical system has been changed.

As it has been described above, in the embodiment, by changing the center of the display image according to the change in the zoom magnification, it is possible to suppress the amount of shift of the shooting range due to the switching over of the optical system, and to ease an unnatural image. Moreover, by a large shift of the shooting range, it is possible to prevent the user from losing sight of the object.

Furthermore, by preventing a sudden change in the depth of field and blurring, it is possible to ease the unnatural image due to the switching over of the optical system.

As it has been described above, the image pickup apparatus according to the present invention has a plurality of optical systems, and is useful for an image pickup apparatus which carries out zooming.

According to the present invention, an effect is shown that it is possible to provide an image pickup apparatus in which it is possible to prevent the shifting of the shooting range.

What is claimed is:

1. An image pickup apparatus comprising:
a plurality of optical systems, each having a different focal length;
an image pickup element which picks up an image of an object as input to at least one of the plurality of optical systems; and
a zoom control section which changes an angle of field of an image output by at least one optical system from among the plurality of optical systems, wherein
a part of the angle of field which changes is same as an angle of field of another optical system, and the image pickup apparatus further comprising:
a control section which changes a central position of a first display image at the time of a zooming operation toward an optical-axial center of the another optical system for which the part of the angle of field is same,
wherein the first display image is derived from the image output by the at least one optical system,
wherein after the control section changes the central position of the first display image, the image pickup apparatus automatically switches from the first display image to a second display image derived from an image output by the another optical system, and
wherein the central position of the first display image at the time of the zooming operation is different from a central position of the second display image.

2. The image pickup apparatus according to claim 1, wherein
the plurality of optical systems include n number of optical systems, and
when
a focal length of an optical system having m numbered (mth) short focal length is let to be $f_m$ (m=1~n; and m and n are integers), and
a focal length at a wide angle end is let to be a focal length $f_1$, and
a focal length at a telephoto end is let to be a focal length $f_n$,
the optical system having the focal length $f_m$ has a fixed focal point, and
the zoom control section carries out zooming by an electronic zooming.

3. The image pickup apparatus according to claim 1, wherein
the plurality of optical systems include n number of optical systems, and
when
a focal length of an optical system having m numbered (mth) short focal length is let to be $f_m$ (m=1~n; and m and n are integers), and
at the time of zooming between an optical system having a focal length $f_m$ and an optical system having a focal length $f_{m-1}$, an amount of change in a horizontal direction of a center of a display image from an optical axial center of the optical system having the focal length $f_m$ and an amount of change in a vertical direction of the center of the display image from the optical axial center of the optical system having the focal length $f_m$ satisfy the following conditional expressions (1) and (2) respectively, $$x_{m,m-1} = dx_{m,m-1} \times B_{m,m-1}/(B_{m,m-1} - B_{m-1}) \quad (1)$$

$$y_{m,m-1} = dy_{m,m-1} \times B_{m,m-1}/(B_{m,m-1} - B_{m-1}) \quad (2)$$

where,
$dx_{m,m-1}$ denotes a distance in the horizontal direction between the optical axial center of the optical system having the focal length $f_m$ and an optical axial center of the optical system having the focal length $f_{m-1}$,
$dy_{m,m-1}$ denotes a distance in the vertical direction between the optical axial center of the optical system having the focal length $f_m$ and the optical axial center of the optical system having the focal length $f_{m-1}$,
$B_{m-1}$ denotes a zoom magnification at the time of capturing by the optical system having the focal length $f_{m-1}$, and $$B_{m,m-1} = f_m/f_{m-1}.$$

4. The image pickup apparatus according to claim 1, wherein
the plurality of optical systems include n number of optical systems, and
when
a focal length of an optical system having m numbered (mth) short focal length is let to be $f_m$ (m=1~n; and m and n are integers), and
the image pickup apparatus satisfies the following conditional expressions (3) and (4)

$$dx_{m,m-1} < L_m \times (\text{Tan}\,\theta x_{m-1} - A \times \text{Tan}\,\theta_{xm}) \quad (3)$$

$$dy_{m,m-1} < L_m \times (\text{Tan}\,\theta y_{m-1} - A \times \text{Tan}\,\theta y_m) \quad (4)$$

$$B_{m,m-1} = f_m/f_{m-1}$$

$$10 \geq A \geq 1$$

where,
$dx_{m,m-1}$ denotes a distance in a horizontal direction between an optical axial center of an optical system having a focal length $f_m$ and an optical axial center of an optical system having a focal length $f_{m-1}$,
$dy_{m,m-1}$ denotes a distance in a vertical direction between the optical axial center of the optical system having the focal length $f_m$ and the optical axial center of the optical system having the focal length $f_{m-1}$,
$B_{m-1}$ denotes a zoom magnification at the time of capturing by the optical system having the focal length $f_{m-1}$,
$\theta x_m$ and $\theta x_{m-1}$ denote a half angle of field in x-direction,
$\theta y_m$ and $\theta y_{m-1}$ denote a half angle of field in y-direction, and
A is a coefficient.

5. The image pickup apparatus according to claim 4, wherein
in the following expression $$2 > A > 1,$$

a shooting range of the optical system having the focal length $f_m$ when m>1 is included at least in a shooting range of another optical system, and an image generating section, in a display range when a center of the display range has changed, interpolates an image out of a shooting range by an optical system which has been selected, by using an image in the shooting range by another optical system which has not been selected.

6. The image pickup apparatus according to claim 5, wherein the image generating section generates an image captured by the optical system having the focal length $f_m$, and a display image by using the image captured by the optical system having the focal length $f_{m-1}$.

7. The image pickup apparatus according to claim 1, wherein the image display section displays a direction of movement of a center of the first display image.

8. The image pickup apparatus according to claim 1, wherein
the control section, at the time of switching over among the plurality of optical systems, switches over to an optical system having an F-number for which, a change in blurring of a captured image is small, and
the image pickup apparatus satisfies the following conditional expressions (5) and (6)

$$FNO_{m-1} = FNO_m / ((f_m / f_{m-1})^2) \quad (5)$$

$$f_m > f_{m-1} \quad (6)$$

where,
$FNO_{m-1}$ denotes an F-number of the optical system having the focal length $f_{m-1}$, and
$FNO_m$ denotes an F-number of the optical system having the focal length $f_m$.

9. The image pickup apparatus according to claim 1, wherein the control section changes a size of an image pickup surface for each optical system according to the focal length.

10. The image pickup apparatus according to claim 1, wherein at least one of the optical systems has one or more than one variable refractive power lens.

11. The image pickup apparatus according to claim 1, wherein
at least in an optical system having longest focal length from among the plurality of optical systems, light from the object is reflected at least once inside a lens in the optical system, and
a distance from a lens surface on an object side of at least the optical system having the longest focal length up to the image pickup element and a distance from a lens surface on the object side of another optical system up to the image pickup element are same.

12. The image pickup apparatus according to claim 1, wherein the image pickup apparatus switches from the first display image to the second display image during a subsequent zooming operation.

13. The image pickup apparatus according to claim 1, wherein when the first display image is switched to the second display image, the central position of the first display image and the central position of the second display image are the same.

* * * * *